(12) United States Patent
Walker

(10) Patent No.: US 8,743,234 B1
(45) Date of Patent: Jun. 3, 2014

(54) VIDEO GAMMA CORRECTION

(75) Inventor: Barry Walker, Elbert, CO (US)

(73) Assignee: Flir Systems, Inc., Wilsonville, OR (US)

( * ) Notice: Subject to any disclaimer, the term of this patent is extended or adjusted under 35 U.S.C. 154(b) by 255 days.

(21) Appl. No.: 13/414,574

(22) Filed: Mar. 7, 2012

Related U.S. Application Data

(60) Provisional application No. 61/450,037, filed on Mar. 7, 2011.

(51) Int. Cl.
| | |
|---|---|
| H04N 5/228 | (2006.01) |
| H04N 5/202 | (2006.01) |
| G06K 9/00 | (2006.01) |
| G06K 9/38 | (2006.01) |
| G06K 9/40 | (2006.01) |

(52) U.S. Cl.
USPC ........ 348/222.1; 348/254; 382/251; 382/270; 382/274

(58) Field of Classification Search
CPC ............................. H04N 7/26079; G06K 9/38
USPC ................ 348/222.1, 254; 382/251, 270, 274
See application file for complete search history.

(56) References Cited

U.S. PATENT DOCUMENTS

| | | | |
|---|---|---|---|
| 7,262,719 B2 * | 8/2007 | Rijavec ........................... | 341/65 |
| 2001/0028749 A1 * | 10/2001 | Kimura ......................... | 382/240 |
| 2002/0109779 A1 * | 8/2002 | Kuroiwa .................... | 348/222.1 |
| 2006/0291720 A1 * | 12/2006 | Malvar et al. ................. | 382/166 |
| 2010/0119153 A1 * | 5/2010 | Rai ............................... | 382/190 |

\* cited by examiner

*Primary Examiner* — Sinh Tran
*Assistant Examiner* — Mark Monk
(74) *Attorney, Agent, or Firm* — Haynes and Boone, LLP

(57) ABSTRACT

A technique of approximating exponential transformations such as gamma correction is disclosed that achieves high resolution without requiring relatively large RAMs for lookup tables or specialized DSP processors. The technique includes the acts of scaling the pixel values according to their values, wherein smaller pixel values are scaled with larger scale factors and larger pixel values are scaled with smaller scale factors; quantizing the scaled pixel values; looking up the quantized pixel values in a lookup table to provide lookup values; and scaling the lookup values responsive to their scale factors to provide the gamma-corrected pixel values.

20 Claims, 2 Drawing Sheets

VIDEO GAMMA CORRECTION

RELATED APPLICATION

This U.S. Patent Application claims the benefit of U.S. Provisional Patent Application No. 61/450,037, filed Mar. 7, 2011, which is incorporated by reference herein in its entirety.

TECHNICAL FIELD

This application relates to imaging, and more particularly to an efficient gamma correction technique.

BACKGROUND

Human vision is nonlinear with respect to perceived brightness. This nonlinearity may be better understood with regard to the following example: suppose one has taken two digital photographs of the same object. In general, digital camera sensors are linear devices. Thus, if one of the photographs is taken with twice the exposure time, one would expect a display of that photograph to be perceived as twice as bright as the remaining image. But if those digital images are then displayed without gamma correction, the displayed images will not have this proportionality in perceived brightness because of the nonlinear behavior of human vision. Even though the raw pixels corresponding to each image faithfully captured the brightness according to the exposure time, the user will perceive the images as having improper contrast when displayed due to the nonlinear behavior of human vision. Thus, it is conventional to adjust raw pixels such as still photograph and video data using a gamma correction value. The resulting gamma correction converts raw pixels into exponentially scaled pixels that are gamma corrected. To perform the desired gamma correction, it is conventional to process the raw pixels with lookup tables, piece-wise linear approximations, digital signal processor (DSP) based math routines, or combinations of these approaches. But using large lookup tables requires a relatively large amount of electrical power, which is thus not energy-efficient, and may require a large amount of memory. Moreover, a specialized DSP is relatively costly.

Accordingly, there is a need in the art for improved gamma correction techniques that can be implemented efficiently and at low cost.

SUMMARY

In accordance with an aspect of the disclosure, a method of approximating an exponential transformation such as gamma correction for pixel values is provided that includes: progressively scaling the pixel values inversely according to their magnitudes such that pixel values with smaller magnitudes are scaled with larger scale factors and pixel values with larger magnitudes are scaled according to smaller scale factors; quantizing the scaled pixel values having larger magnitudes to provide quantized scaled pixel values, wherein a remaining portion of smallest scaled pixel values remains unquantized; looking up the quantized scaled pixel values and the remaining portion of smallest scaled pixel values in a lookup table to provide lookup values, wherein each lookup value corresponds uniquely to a corresponding one of the pixel values; and scaling the lookup values responsive to the scale factors applied to the corresponding pixel values to provide the gamma-corrected pixel values.

In accordance with another aspect of the disclosure, an image processor for gamma-correcting pixel values is provided that includes: a lookup table; and a logic engine configurable to inversely scale the pixel values according to their magnitudes such that pixel values with smaller magnitudes are scaled with larger scale factors and pixel values with larger magnitudes are scaled according to smaller scale factors, the logic engine being further configurable to quantize the scaled pixel values having larger magnitudes to provide quantized scaled pixel values, wherein a remaining portion of smallest scaled pixel values remains unquantized, the logic engine being further configurable to look up the quantized scaled pixel values and the remaining portion of smallest scaled pixel values in the lookup table to provide lookup values, wherein each lookup value corresponds uniquely to a corresponding one of the pixel values, the logic engine being further configurable to scale the lookup values responsive to the scale factors applied to the corresponding pixel values to provide the gamma-corrected pixel values.

In accordance with another aspect of the disclosure, a method of transforming input values according to an exponential transformation is provided that includes: progressively scaling the input values inversely according to their magnitudes such that input values with smaller magnitudes are scaled with larger scale factors and input values with larger magnitudes are scaled according to smaller scale factors; quantizing the scaled input values having larger magnitudes to provide quantized scaled input values, wherein a remaining portion of smallest scaled input values remains unquantized; looking up the quantized scaled input values and the remaining portion of smallest scaled input values in a lookup table to provide lookup values, wherein each lookup value corresponds uniquely to a corresponding one of the input values; and scaling the lookup values responsive to the scale factors applied to the corresponding input values to provide exponentially-transformed input values.

Figure 1:
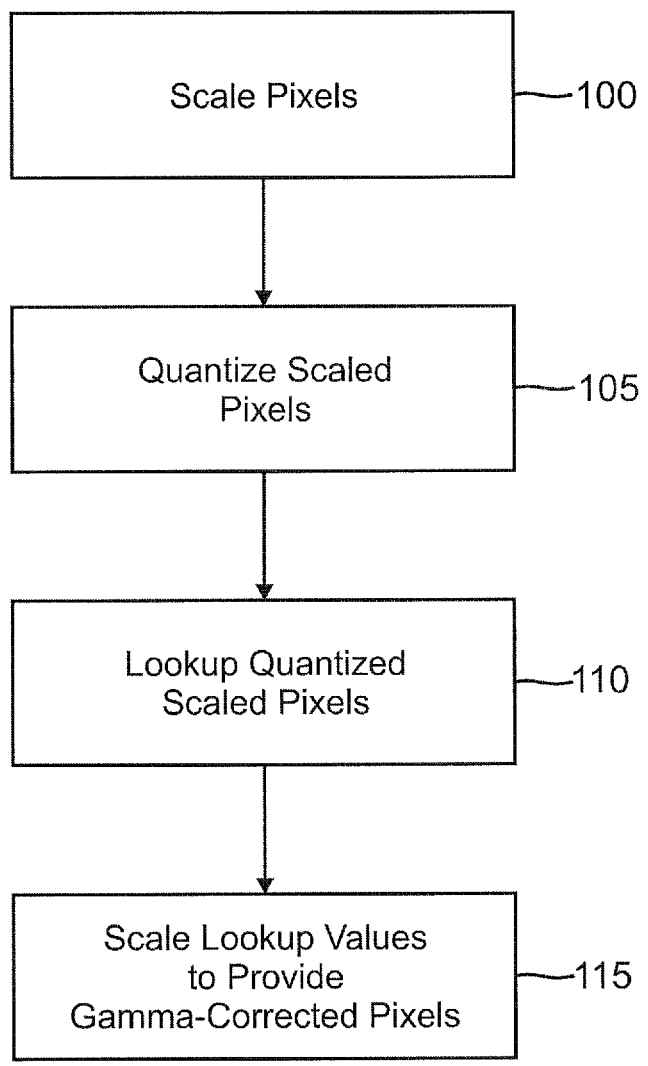
FIG. 1 is as flowchart for an embodiment of the gamma correction technique.

A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

DETAILED DESCRIPTION

The following discussion will address gamma correction. However, it will be appreciated that the disclosure is not limited to gamma correction but can instead be widely applied to approximating exponential transformations (e.g., exponential type non-linear transformations). To provide gamma correction relatively inexpensively yet with high precision, a logic engine such as a field programmable gate array (FPGA) is configured to use an embedded block RAM as a lookup table. The remaining discussion will assume that the logic engine comprises an FPGA but it will be appreciated that a dedicated ASIC or other suitable hardware and/or software can be used to form the logic engine performing the exponential transformations. But the embedded block RAMs for FPGAs are typically 18K bit block RAMs. Such a size is adequate for most low resolution applications. But as higher resolution is demanded, the 18K bit size for FPGA block RAMs becomes limiting. For example, suppose one desires to gamma correct 14-bit input pixels into 18-bit gamma-corrected pixels. An 18K block RAM can only provide 1024 18-bit outputs. Thus, if one desires 18-bit corrected pixels, a single 18K block RAM can only accommodate 10-bit input pixels since $2^{10}$ equals 1024. To correct 14-bit pixel values, one would thus have to program sixteen 18K block RAMs.

But an FPGA typically has a limited number of embedded block RAMs. Moreover, image processing will require the use of some of these block RAMs for other purposes such that the number of available block RAMs in a typical FPGA is even more limited. But by exploiting the distributive property of exponential functions, a single 18K block RAM is enabled to process 14-bit input pixel values into 18-bit gamma-corrected pixel values as discussed further herein. Although the following example will address the conversion of 14-bit values into 18-bit corrected values it will be appreciated that the conversion techniques discussed herein may be widely applied to convert (M+N)-bit values using a lookup table of just $2^M$ entries, where M and N are positive integers.

The application of the distributive property to gamma correction is as follows: if a gamma-corrected pixel value is represented by y and an input pixel value represented by x, then gamma correction for a gamma value of 2.2 is given by:

$$y = x^{(1/2.2)} \quad \text{Eq. (1)}$$

But by the distributive property for exponential functions, Eq (1) is also equal to $$y = (\tfrac{1}{2})^{(1/2.2)} (2x)^{(1/2.2)} \quad \text{Eq. (2)}$$

One can thus readily see that Eq. (1) can similarly be modified if the input value is multiplied by 4, 8, 16, etc. In each case, the product of x may be looked up in the same gamma function lookup table as used for Eq. (1) so long as the output is multiplied by the appropriate scaling constant. Moreover, this distributive property is generic to all gamma values such that other gamma values (e.g., 1.5) are also within the scope of this property.

This binary multiplication of pixel input values (ranging from 1, 2, 4, 8, 16, etc.) is readily performed in an FPGA since binary multiplication is just a simple shift. For example, one would merely shift by four bits for a multiplication by sixteen, shift by three bits for a multiplication by eight, and so on. A fourteen bit pixel input value will range from 0 to 16383. Such a 14-bit input range may be divided into binary ranges starting from the desired 10-bit input value as set forth in Table 1, as an example in accordance with an embodiment.

TABLE 1

| Input Value | Input Range | Scale | Quantization | Resolution Loss |
| --- | --- | --- | --- | --- |
| 0-1023 | 10 bits | *16 | 10 bits | 0 bits |
| 1024-2047 | 11 bits | *8 | 10 bits | 1 bit |
| 2048-4095 | 12 bits | *4 | 10 bits | 2 bits |
| 4096-8191 | 13 bits | *2 | 10 bits | 3 bit |
| 8192-16383 | 14 bits | *1 | 10 bits | 4 bits |

Consider the first row of Table 1: even though the scaled inputs will range from 0 to 16383 (corresponding to the multiplication of the input pixel range of 0 to 1023 by 16) and thus requires 14 bits, there remains only 1024 such scaled values. Thus, the scaled values are readily quantized to 10 bits. For example, the input pixel value of zero will scale to zero and such a value may then be considered as addressing the first word in the 18K block RAM. Similarly, the input pixel value of one will scale to 16, which may then be considered as addressing the second word in the 18K block RAM, and so on. Thus, even though the input pixels ranging from 0 to 1023 are scaled by sixteen, the resulting scaled values may still be used to address a 10-bit input lookup table without any loss of resolution.

However, some resolution will be lost as the input range successively climbs in multiples of two. For example, the input range of 1024 to 2047 is multiplied by eight and is thus scaled to correspond to 8192 to 16383. But the lookup table has just 10 bits and thus the scaled inputs must be quantized to range from the $512^{th}$ to the 1023th entry in the 18K block RAM lookup table. In other words, each entry in the lookup table will correspond to two input pixels for the second row of Table 1. There is thus a one bit loss of resolution for the second row of Table 1. Similarly, the remaining input range of Table 1 (rows 3 to 6) will progressively require greater and greater quantization. But each successive row of Table 1 (from the third row on) has twice the number of input values as the preceding row and thus loses one bit of resolution per row. For example, each entry of the lookup table will correspond to sixteen input pixels for the last row of Table 1. But such resolution loss is not disadvantageous because gamma correction puts a higher premium on the resolution of the smaller input values. In other words, the smaller the input value, the larger the amount of the gamma correction that is applied.

Turning now to the drawings, a flowchart (FIG. 1) for the resulting algorithm is provided, in accordance with one or more embodiments. Although Table 1 was described with regard to a 10-bit input pixel value lookup table, one will readily appreciate that such an example can be generalized for an n-bit input value, where n is some arbitrary positive integer. In an initial step 100, the pixel values are scaled according to their values as discussed analogously with regard to Table 1. Thus, the input values are scaled according to what input range they correspond to, starting with the input range of 0 to n−1, a subsequent input range of n to 2n−1, and so on until the final input range of (y−1)*n to y*n−1 is scaled by a factor of 1, where y is some positive integer. The scale factors for such a generic set of input values would thus range from $2^y$ for the input range of 0 to n−1 down to one for the final input range of (y−1)*n to y*(n−1). In a step 105, the scaled pixel values from step 100 are quantized to n-bit values as discussed above. The smallest set of scaled pixel values requires no quantization as discussed with regard to the first row of Table 1. In a step 110, the quantized values and the smallest set of scaled pixel values are processed in the n-bit input lookup table. Finally, in a step 115, the resulting lookup values from lookup table are scaled responsive to the scale value used in step 100 to provide gamma-corrected pixel output values.

To better illustrate the process discussed with regard to FIG. 1, its application to gamma correcting 16-bit input values using a 10-bit lookup table will now be discussed. In the initial step 100, the 16-bit input values would be scaled appropriately. In that regard, the input range of 0 to 1023 is multiplied by sixty-four to produce 16-bit scaled values. Similarly, the input range of 1024 to 2047 is multiplied by thirty-two, and so on until the final input range of 32768 to 65535 is unchanged (corresponding to a scale factor of unity). Because the lookup table will have only 1024 entries (10 bits), all the scaled inputs must be quantized in step 105 except for the initial input range of 0 to 1023 since there is a table lookup for every member of that initial input range. For example, note that there are 32768 possible members for the initial input range of 32768 to 65535. Yet that range must scale from the $512^{th}$ to $1024^{th}$ entry in the lookup table as analogously discussed above for the 14-bit embodiment. Thus, each lookup table value in that range would correspond to 64 inputs from the input range of 32768 to 65535.

Figure 2:
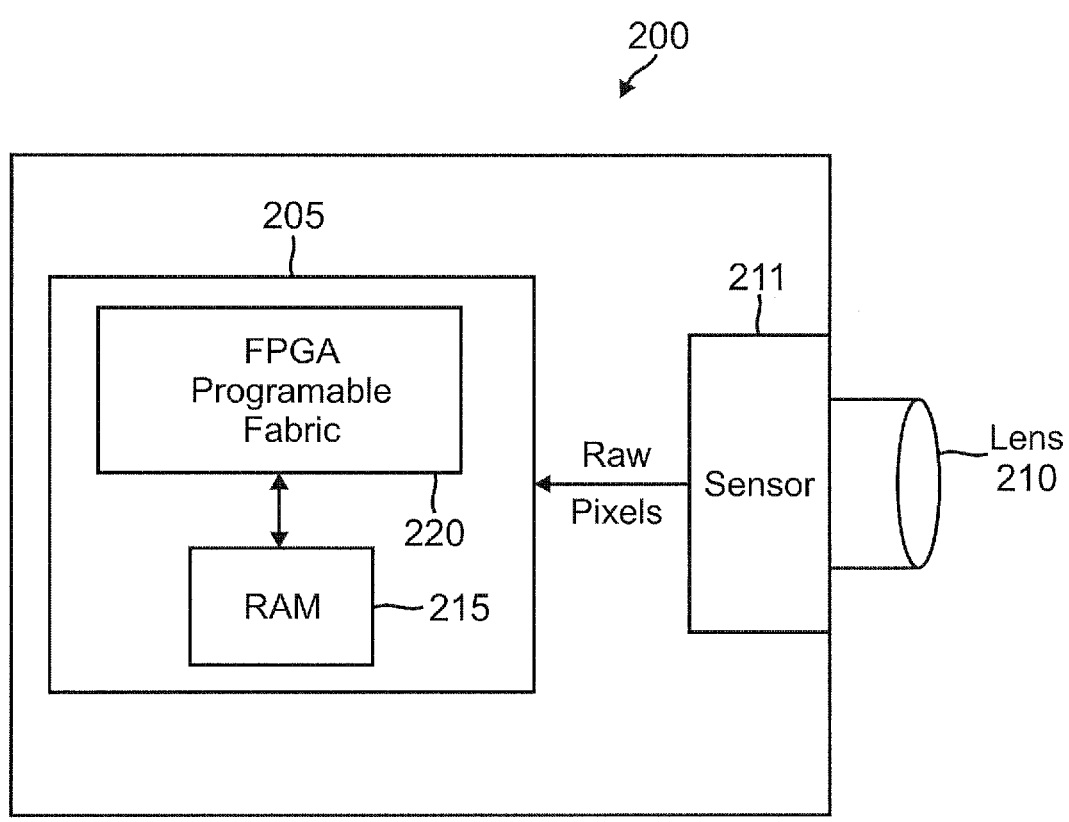
FIG. 2 is a block diagram for an embodiment of a camera including an FPGA configured to perform the gamma correction method of FIG. 1.

A camera 200 is shown in FIG. 2, in accordance with one or more embodiments, which includes a logic engine such as FPGA 205 configured to perform the algorithm discussed in reference to FIG. 1. Camera 200 includes a lens 210 that focuses an image onto a sensor 211 (e.g., any type of sensor, such as for example a visible image sensor or an infrared sensor) that provides the input pixels to FPGA 205. FPGA 205 includes an n-bit input value block RAM 215 and a programmable fabric 220 (e.g., programmable logic fabric). Programmable fabric 220 for FPGA 205 is configured to perform the scaling and quantizing of steps 100 and 105 discussed with regard to FIG. 1. Programmable fabric 220 then retrieves the corresponding entries from the block RAM 215 according to the quantized values and scales the retrieved values to produce the gamma-corrected pixels as discussed above with regard to step 115 of FIG. 1. In this fashion, camera 200 advantageously achieves high resolution gamma correction without the expense of requiring relatively large memory-based lookup tables or specialized DSP processors.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

I claim:

1. A method of gamma correcting pixel values, the method comprising:
within an image processor:
progressively scaling the pixel values inversely according to their magnitudes such that pixel values with smaller magnitudes are scaled with larger scale factors and pixel values with larger magnitudes are scaled according to smaller scale factors;
quantizing the scaled pixel values having larger magnitudes to provide quantized scaled pixel values, wherein a remaining portion of smallest scaled pixel values remains unquantized;
looking up the quantized scaled pixel values and the remaining portion of smallest scaled pixel values in a lookup table to provide lookup values, wherein each lookup value corresponds uniquely to a corresponding one of the pixel values; and
scaling the lookup values responsive to the scale factors applied to the corresponding pixel values to provide the gamma-corrected pixel values.

2. The method of claim 1, wherein a first set of pixel values having smallest magnitudes are scaled with a largest scaling factor, a second set of pixel values having second-to the smallest magnitudes are scaled with a smaller scaling than the largest scaling factor, and so on such that a final set of pixel values having largest magnitudes are scaled with a smallest scaling factor.

3. The method of claim 2, wherein the first set of pixel values have magnitudes of N bits or less, the second set of pixel values have magnitudes between N bits and N+1 bits, and so on such that the final set of pixel values have magnitudes between N+(M−1) and N+M bits, wherein N and M are each positive integers.

4. The method of claim 3, wherein the largest scaling factor for the first set of pixel values equals $2^M$, the smaller scaling factor for the second set of pixel values equals $2^{(M-1)}$ and so on such that the smallest scaling factor for the final set of pixel values equals $2^{(M-N)}$.

5. The method of claim 4, wherein the lookup table has $2^M$ entries.

6. The method of claim 5, wherein M is 10 and N is 4.

7. The method of claim 1, wherein the pixel values are 14 bits or less in magnitude and wherein the gamma-corrected pixel values are 18 bits or more in magnitude.

8. The method of claim 1, wherein the image processor comprises a field programmable gate array (FPGA).

9. The method of claim 8, wherein the lookup table comprises an embedded block Random Access Memory (RAM) within the FPGA.

10. An image processor for gamma-correcting pixel values, comprising:
a lookup table; and
a logic engine configurable to inversely scale the pixel values according to their magnitudes such that pixel values with smaller magnitudes are scaled with larger scale factors and pixel values with larger magnitudes are scaled according to smaller scale factors, the logic engine being further configurable to quantize the scaled pixel values having larger magnitudes to provide quantized scaled pixel values, wherein a remaining portion of smallest scaled pixel values remains unquantized, the logic engine being further configurable to look up the quantized scaled pixel values and the remaining portion of smallest scaled pixel values in the lookup table to provide lookup values, wherein each lookup value corresponds uniquely to a corresponding one of the pixel values, the logic engine being further configurable to scale the lookup values responsive to the scale factors applied to the corresponding pixel values to provide the gamma-corrected pixel values.

11. The image processor of claim 10, wherein the logic engine comprises a programmable logic device.

12. The image processor of claim 11, wherein the programmable logic device is a field programmable gate array (FPGA).

13. The image processor of claim 12, wherein the lookup table comprises at least one embedded block Random Access Memory (RAM) within the FPGA.

14. The image processor of claim 10, further comprising an image sensor for providing the pixel values.

15. The image processor of claim 10, wherein the lookup table has $2^M$ entries and the pixel values have magnitudes ranging to $2^{(M+N)}$ bits in magnitude, wherein M and N are positive integers.

16. A method of transforming input values according to an exponential transformation, the method comprising:
within a logic engine:
progressively scaling the input values inversely according to their magnitudes such that input values with smaller magnitudes are scaled with larger scale factors and input values with larger magnitudes are scaled according to smaller scale factors;
quantizing the scaled input values having larger magnitudes to provide quantized scaled input values, wherein a remaining portion of smallest scaled input values remains unquantized;

looking up the quantized scaled input values and the remaining portion of smallest scaled input values in a lookup table to provide lookup values, wherein each lookup value corresponds uniquely to a corresponding one of the input values; and scaling the lookup values responsive to the scale factors applied to the corresponding input values to provide exponentially-transformed input values.

17. The method of claim 16, wherein a first set of input values having smallest magnitudes are scaled with a largest scaling factor, a second set of input values having second-to the smallest magnitudes are scaled with a smaller scaling than the largest scaling factor, and so on such that a final set of input values having largest magnitudes are scaled with a smallest scaling factor.

18. The method of claim 17, wherein the first set of input values have magnitudes of N bits or less, the second set of input values have magnitudes between N bits and N+1 bits, and so on such that the final set of input values have magnitudes between N+(M−1) and N+M bits, wherein N and M are each positive integers.

19. The method of claim 18, wherein the largest scaling factor for the first set of input values equals $2^M$, the smaller scaling factor for the second set of input values equals $2^{(M-1)}$ and so on such that the smallest scaling factor for the final set of input values equals $2^{(M-N)}$.

20. The method of claim 19, wherein the input values are (M+N) bit values and the lookup table has $2^M$ entries.

\* \* \* \* \*